July 11, 1950     S. B. HASELTINE     2,514,574
FRICTION SHOCK ABSORBER
Filed May 29, 1948

Inventor:
Stacy B. Haseltine.
By Henry Fuchs.
Atty.

Patented July 11, 1950

2,514,574

UNITED STATES PATENT OFFICE 2,514,574

FRICTION SHOCK ABSORBER

Stacy B. Haseltine, La Grange, Ill., assignor to W. H. Miner, Inc., Chicago, Ill., a corporation of Delaware Application May 29, 1948, Serial No. 30,081

3 Claims. (Cl. 267—9)

This invention relates to improvements in friction shock absorbers more particularly designed for snubbing the action of railway car truck springs.

One object of the invention is to provide a friction shock absorber of the character indicated, comprising a pair of relatively lengthwise slidable posts having frictional engagement with each other, wherein guide means is provided in the form of interengaging faces of tongue and groove formation on the posts for preventing lateral tilting of the posts with respect to each other.

A further object of the invention is to provide in a friction shock absorber comprising relatively lengthwise movable friction posts, means for preventing lateral displacement of the posts with respect to each other, comprising longitudinally extending, interengaging portions of tongue and groove formation, forming the contacting friction face portions of the posts, and means for holding the tongue and groove portions in interfitting relation, comprising a guide lug rigid with each post at the friction face side thereof and spaced therefrom to accommodate a portion of the other post for sliding movement therebetween.

Other objects of the invention will more clearly appear from the description and claims hereinafter following.

Figure 1:
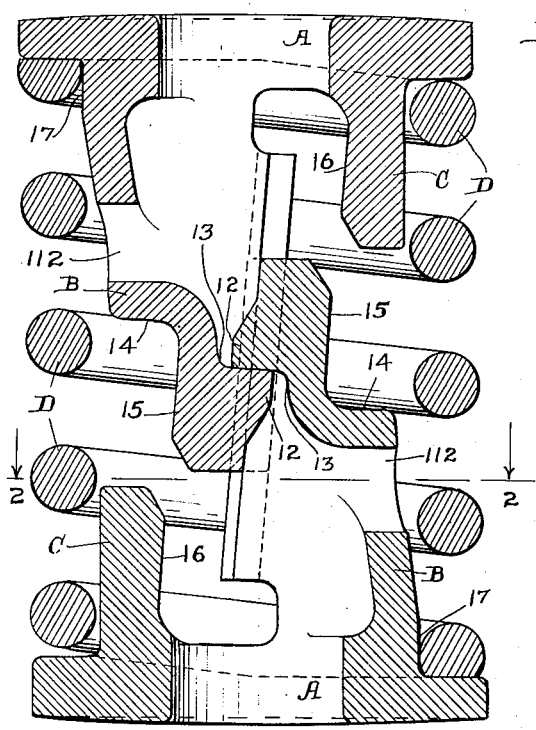
Figure 3:
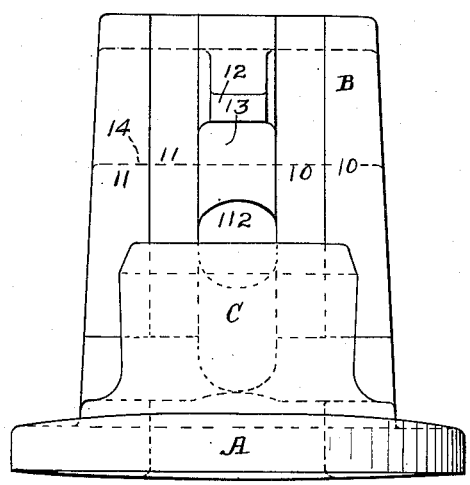
Figure 2:
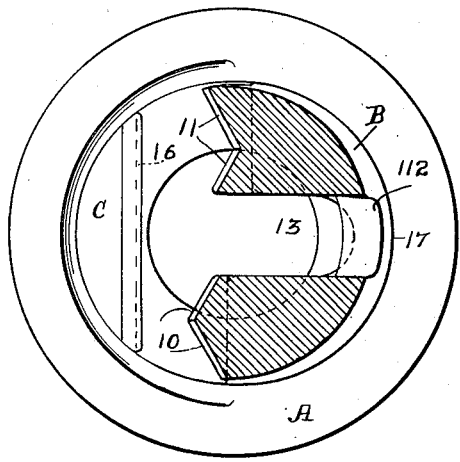
Figure 4:
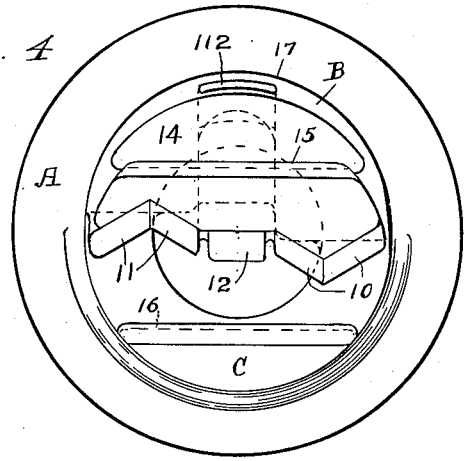

In the accompanying drawing forming a part of this specification, Figure 1 is a transverse, central, vertical sectional view of my improved shock absorber. Figure 2 is a horizontal sectional view, corresponding substantially to the line 2—2 of Figure 1, with the spring omitted. Figure 3 is a side elevational view of the lower friction post shown in Figure 1, looking from left to right in said figure. Figure 4 is a top plan view of Figure 3.

My improved shock absorber, as illustrated in the drawing, comprises broadly top and bottom followers A—A, cooperating top and bottom friction posts B—B extending from the followers, guide lugs C—C on the followers for holding the posts against lateral outward displacement with respect to each other, and a spring resistance D yieldingly opposing relative longitudinal movement of the posts and forcing the same into frictional contact with each other.

The top and bottom posts B—B are of identical design, each post being formed integral with the corresponding follower A, and each follower A being in the form of an annular flange at the base portion of the post. The two posts B—B are reversely arranged, that is, the top post B is inverted with respect to the bottom post B. As clearly shown in Figures 1 and 3, the follower A of the lower post B is located at the bottom of the device and has the post upstanding therefrom, while the follower A of the upper post B, as shown in Figure 1, is located at the upper end of the device and has the post depending therefrom. Each post B presents a pair of lengthwise extending, laterally spaced, inclined friction surfaces 10 and 11 on the inner side thereof, the surface 10 being of projecting, tonguelike, V-shaped, transverse cross section, and the surface 11 being of indented, groovelike, V-shaped transverse cross section. The projecting V-shaped surface 10 of the bottom post is interengaged with the groovelike, V-shaped surface 11 of the top post, and the projecting, V-shaped surface 10 of the top post is interengaged with the groovelike, V-shaped surface 11 of the bottom post. The two posts thus present friction surfaces of interengaging tongue and groove formation.

At the outer end thereof, each post is provided with a stop lug 12 at the inner side between the friction surfaces 10 and 11 thereof, which lug is engageable with the corresponding lug 12 of the other post to limit longitudinal separation of the posts. Inwardly of the lug 12 of each post, the inner side of the post is cut out, or longitudinally grooved, as indicated at 13, to accommodate the lug 12 of the other post. Each post is further provided with an opening 112 inwardly of the lug thereof, which opening communicates with the groove 13, the openings 112—112 being provided to accommodate a tool in the form of a bar for forcing the lugs 12—12 apart in disassembling the device.

The outer end portion of each post, that is, the end which is provided with the lug 12 is of reduced thickness, as shown, thus providing a transverse stop shoulder 14 adapted to be engaged by the extremity of the lug C of the other post to limit compression of the device. This reduced portion of each post presents a substantially flat surface 15, which is inclined to the same degree as the friction surface of the post.

The guide lugs C—C are formed integral with the respective followers A—A. The lugs C of each follower is spaced from and opposed to the friction surface of the post B of said follower, and has its inner side, which is indicated by 16, inclined to the same degree as the friction surface of this post. The space between the friction surface side of each post and the corresponding lug C forms a guideway adapted to accommodate the reduced end of the other post for sliding movement.

The spring resistance D is in the form of a helical coil surrounding the posts B—B and bears at its top and bottom ends on the followers A—A, respectively.

The interior diameter of the coil spring D and the spread of the coacting friction posts B—B is such that the inner sides of the top and bottom coils of the spring bear laterally inwardly at respectively opposite sides of the device on the vertical side walls of the base portions of the posts, which side walls are indicated at 17—17, that is, the inner side of the coil at the lower end of the spring bears on the vertical side wall 17 of the bottom post B at the right hand side of the mechanism, as shown in Figure 1, and the coil at the upper end of the spring bears on the wall 17 of the top post B at the left hand side of the mechanism, the spread of the posts being such that the lower end portion of the spring is displaced slightly to the right and the upper end portion slightly to the left. The posts are thus held in intimate frictional contact along the friction surfaces thereof by the spring D. The spring D also yieldingly opposes relative movement of the followers A—A and the posts B—B thereof toward each other.

The improved shock absorber preferably replaces one or more of the spring units of a spring cluster of a railway car truck, being interposed between the usual top and bottom spring plates, which cooperate with the cluster.

The operation of my improved shock absorber is as follows: Upon the spring cluster of the truck of a railway car being compressed between the spring follower plates of the cluster, the shock absorbing unit, which is disposed between said follower plates, is compressed therebetween, thereby forcing the top post B downwardly toward the bottom post B, against the resistance of the spring D. High frictional resistance is thus producer. As shown in Figure 1, the outer ends of the posts B—B are slightly spaced from the cooperating guide lugs C—C in the completely expanded condition of the device. However, in actual service, the unit is under a certain amount of initial compression due to the normal weight of the body of the car, the upper post being depressed to an extent to project the lower end of the same into the guideway between the lower post and lug, and the upper end of the lower post into the guideway between the upper post and lug. As compression of the device progresses, the ends of the posts travel along the guideways provided by the lugs C—C and the opposed friction surfaces of the posts. The posts are thus held against lateral separation and the tongue and groove formation friction surfaces held interengaged. Compression of the device is finally limited by engagement of the outer end of the lug C of one post with the stop shoulder 14 of the other post. Upon release of the mechanism, the parts are restored to their normal position by the expansive action of the spring D, longitudinal separation of the parts being limited by engagement of the lugs 12—12 of the posts with each other.

I claim:

1. In a friction shock absorber, the combination with a pair of relatively lengthwise slidable friction posts having interengaging, longitudinally extending friction surfaces of tongue and groove formation on their inner sides; of a guide lug fixed with respect to each post and spaced laterally therefrom, forming a guideway between said post and lug to accommodate the other post for sliding movement; and spring means yieldingly opposing relative lengthwise movement of said posts toward each other and pressing the same into tight frictional contact.

2. In a friction shock absorber, the combination with a pair of relatively lengthwise slidable friction posts having interengaging, longitudinally extending friction surfaces of tongue and groove formation on their inner sides; of a guide lug fixed with respect to each post and spaced laterally therefrom, forming a guideway between said post and lug to accommodate the other post for sliding movement, said lug and cooperating post having longitudinally extending, transverse, flat cooperating surfaces; and spring means yieldingly opposing relative lengthwise movement of said posts toward each other and pressing the same into tight frictional contact.

3. In a friction shock absorber, the combination with a pair of relatively lengthwise slidable friction posts having interengaging, longitudinally extending friction surfaces of V-shaped, transverse cross section on their inner sides; of a guide lug fixed with respect to each post and spaced laterally therefrom, forming a guideway between said post and lug to accommodate the other post for sliding movement; and spring means yieldingly opposing relative lengthwise movement of said posts toward each other and pressing the same into tight frictional contact.

STACY B. HASELTINE.

REFERENCES CITED

The following references are of record in the file of this patent:

UNITED STATES PATENTS

| Number | Name | Date |
|---|---|---|
| 2,212,814 | Light | Aug. 27, 1940 |
| 2,388,229 | Light | Oct. 30, 1945 |
| 2,410,165 | Johnson et al. | Oct. 29, 1946 |
| 2,426,684 | Haseltine | Sept. 2, 1947 |